United States Patent
Ashida et al.

(10) Patent No.: US 6,962,049 B2
(45) Date of Patent: Nov. 8, 2005

(54) EXHAUST MANIFOLD FOR FOUR-CYLINDER ENGINE

(75) Inventors: Masaaki Ashida, Yokohama (JP); Kimiyoshi Nishizawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/379,681

(22) Filed: Mar. 6, 2003

(65) Prior Publication Data

US 2003/0167759 A1 Sep. 11, 2003

(30) Foreign Application Priority Data

Mar. 8, 2002 (JP) ........................................ 2002-063605

(51) Int. Cl.$^7$ ................................................. F01N 7/10
(52) U.S. Cl. ........................... 60/323; 60/305; 60/312; 60/320; 60/322
(58) Field of Search .................... 60/285, 305, 313, 60/320, 322, 323

(56) References Cited

U.S. PATENT DOCUMENTS

| | | | | |
|---|---|---|---|---|
| 4,022,019 A | * | 5/1977 | Garcea | 60/282 |
| 5,572,868 A | * | 11/1996 | Okamoto et al. | 60/323 |
| 5,595,062 A | * | 1/1997 | Chabry | 60/313 |
| 5,816,045 A | * | 10/1998 | Blocker et al. | 60/323 |
| 5,822,986 A | | 10/1998 | Higashide | |
| 5,867,985 A | * | 2/1999 | Furuhashi et al. | 60/323 |
| 6,009,706 A | * | 1/2000 | Haneda | 60/323 |
| 6,122,911 A | * | 9/2000 | Maeda et al. | 60/323 |

FOREIGN PATENT DOCUMENTS

| | | |
|---|---|---|
| JP | 58-44211 A | 3/1983 |
| JP | 1-66424 U | 4/1989 |
| JP | 2-24897 Y2 | 7/1990 |
| JP | 2-101017 U | 8/1990 |
| JP | 2-103120 U | 8/1990 |
| JP | 4-44438 U | 4/1992 |
| JP | 4-104124 U | 9/1992 |
| JP | 5-21124 U | 3/1993 |
| JP | 7-083048 A | 3/1995 |
| JP | 9-068038 A | 3/1997 |
| JP | 4-134625 U | 12/1998 |
| JP | 2000-337143 A | 5/2000 |

* cited by examiner

Primary Examiner—Binh Q. Tran
(74) Attorney, Agent, or Firm—Foley & Lardner LLP

(57) ABSTRACT

In an exhaust manifold of a four-cylinder engine four cylinders of which line up in order of cylinder #1, cylinder #2, cylinder #3 and cylinder #4, temperature rise performance of a manifold catalyst improves by shortening a total length of the exhaust manifold while preventing exhaust gas interference between the cylinders. Therefore, an exhaust manifold branch of cylinder #1 and an exhaust manifold branch of cylinder #4 in outward sides of the engine that are not fired in succession are made convergent with its convergence angle θ1 being equal to or below 20 degrees to form a first convergent exhaust manifold branch and an exhaust manifold branch of cylinder #2 and an exhaust manifold branch of cylinder #3 between the cylinder #1 and cylinder #4 that are not fired in succession are made convergent at a minimum distance having a laterally projected shape to form a second convergent exhaust manifold branch. The first and the second convergent exhaust manifold branches are thereafter convergent at a convergence angle θ3 from 0 degrees to 20 degrees.

10 Claims, 10 Drawing Sheets

(a)

(b)

TOTAL LENGTH
OF EXHAUST MANIFOLD =
a+b+c+d+e

TOTAL LENGTH
OF EXHAUST MANIFOLD =
a+b+c+d+e+f+g

EXHAUST MANIFOLD FOR FOUR-CYLINDER ENGINE

FIELD OF THE INVENTION

The present invention relates to a four-cylinder engine, and in particular, to an exhaust manifold thereof.

RELATED ART OF THE INVENTION

In an earlier four-cylinder engine, an exhaust manifold branch of a cylinder is convergent with an exhaust manifold branch of a different cylinder that is not fired subsequent to ignition of the cylinder. That is, when an ignition is carried out in an order of cylinder #1-cylinder #3-cylinder #4-cylinder #2, an exhaust manifold branch of cylinder #1 converges into an exhaust manifold branch of cylinder #4 and an exhaust manifold branch of cylinder #2 converges into an exhaust manifold branch of cylinder #3 (Japanese Unexamined Utility Publication No. 1-66424, Japanese Unexamined Utility Publication No. 2-101017, Japanese Unexamined Utility Publication No. 2-103120 and Japanese Examined Utility Publication No. 2-24897).

SUMMARY OF THE INVENTION

In order to shorten a catalyst activation period after an engine is started and aiming at cost reduction of an exhaust gas system, a length of an exhaust manifold from an exhaust port outlet of a cylinder head to a manifold catalyst inlet or a gas contact length inside the exhaust manifold is reduced, thereby restraining a temperature decrease of an exhaust gas and improving temperature rise performance of a catalyst.

On the other hand, as a consequence of the above technology, an engine output torque decreases at a fully opened position of a throttle valve in low and intermediate speed ranges due to increase of exhaust gas interference caused by shortening an exhaust manifold branch or the output torque decreases in a high speed range due to increase of air flow resistance caused by narrowing the exhaust manifold and adding a manifold orifice.

Therefore, an exhaust manifold shape to meet both an exhaust emission performance and an engine output performance is needed.

In view of the foregoing, the exhaust manifold of the engine in the earlier technologies has the following problems.

1. In a converging shape of exhaust manifold branches of a four-cylinder engine, an angle formed by a center axis of an exhaust manifold and a center axis of a neighboring exhaust manifold at a converging point of these neighboring exhaust manifolds is not designed for propagation and damping of a blowdown wave occurring on an exhaust stroke. Especially a converging angle thereof between cylinder #1 and cylinder #4 is large (Japanese Unexamined Utility Publication No. 1-66424, 2-101017, 2-103 120, and Japanese Examined Utility Publication No. 2-24897).

Accordingly, for example, part of the blowdown wave occurring during an exhaust stroke of cylinder #1 is propagated to cylinder #4 and is reflected at an exhaust valve head of cylinder #4 and a positive pressure wave returns again back to an exhaust valve head of cylinder #1.

As a result, since a pressure in the vicinity of the exhaust valve during the exhaust stroke increases, scavenging of a combustion gas in the cylinder deteriorates and an engine torque at low and intermediate ranges is reduced.

2. Two exhaust manifold branches of cylinder #2 and cylinder #3 in the four-cylinder engine are formed apart from a port outlet of the cylinder head to a converging position of each branch (Japanese Unexamined Utility Publication No. 2-101017, 2-103120, Japanese Examined Utility Publication No. 2-24897). In cylinder #2 and cylinder #3, an engine torque reduction due to the exhaust gas interference of each other cylinder is small and where the converging point of each exhaust manifold branch at low and intermediate speed ranges is placed is not important.

However, a total length of the exhaust manifold becomes as long as an independent portion of the exhaust manifold branches, thereby decreasing an exhaust gas temperature at a manifold catalyst inlet and lengthening time for catalyst activation.

3. Two exhaust manifold branches of cylinder #2 and cylinder #3 of a four-cylinder engine are arranged in a slant and downward direction from a cylinder head exhaust port outlet to a branch converging portion and each branch converges in a converging angle of about 60 degrees (Japanese Unexamined Utility Publication No. 1-66424).

Accordingly, each branch is not converged such that a length between the cylinder head exhaust port outlet and the branch converging portion is minimized.

As a result, the total length of the exhaust manifold gets long, the exhaust temperature decreases at the manifold catalyst inlet, and the catalyst activation time is lengthened.

Moreover, the branch converging angle is large and a propagation path of the pressure wave of the exhaust gas easily goes around through the converging portion, thereby creating an engine torque reduction at low and intermediate speed ranges due to exhaust gas interference on its own cylinder.

The present invention, in view of the foregoing problems, provides an exhaust manifold for a four-cylinder engine that satisfies both exhaust emission performance demand and engine output performance demand.

One aspect of the invention provides an exhaust manifold for a four-cylinder engine where two exhaust manifold branches of two cylinders that are not fired in succession are convergent at a convergence angle equal to or below 20 degrees to form a first convergent exhaust manifold branch and two exhaust manifold branches of another two cylinders that are not fired in succession is convergent at a convergence angle equal to or below 20 degrees to form a second convergent exhaust manifold branch, and the first convergent exhaust manifold branch and the second convergent exhaust manifold branch are thereafter made convergent.

A different aspect of the invention provides an exhaust manifold for a four-cylinder engine whose cylinders line up in order of cylinder #1, cylinder #2, cylinder #3, and cylinder #4 and whose firing order is in turn cylinder #1, cylinder #3, cylinder #4, and cylinder #2 where an exhaust manifold branch of cylinder #1 is convergent with an exhaust manifold branch of cylinder #4 to form a first convergent exhaust manifold branch and an exhaust manifold branch of cylinder #2 is convergent with an exhaust manifold branch of cylinder #3 to form a second convergent exhaust manifold branch.

Thereafter, the first and the second convergent exhaust manifold branches are made convergent and a convergent position of the two exhaust manifold branches of cylinder #2 and cylinder #3 is set upstream of a convergent position of the two exhaust manifold branches of cylinder #1 and cylinder #4.

These and other aspects, and features of this invention will be understood from the following description with accompanying drawings.

DETAILED DESCRIPTION OF THE PREFERRED EMBODIMENTS OF THE INVENTION

Selected embodiments of the present invention will be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
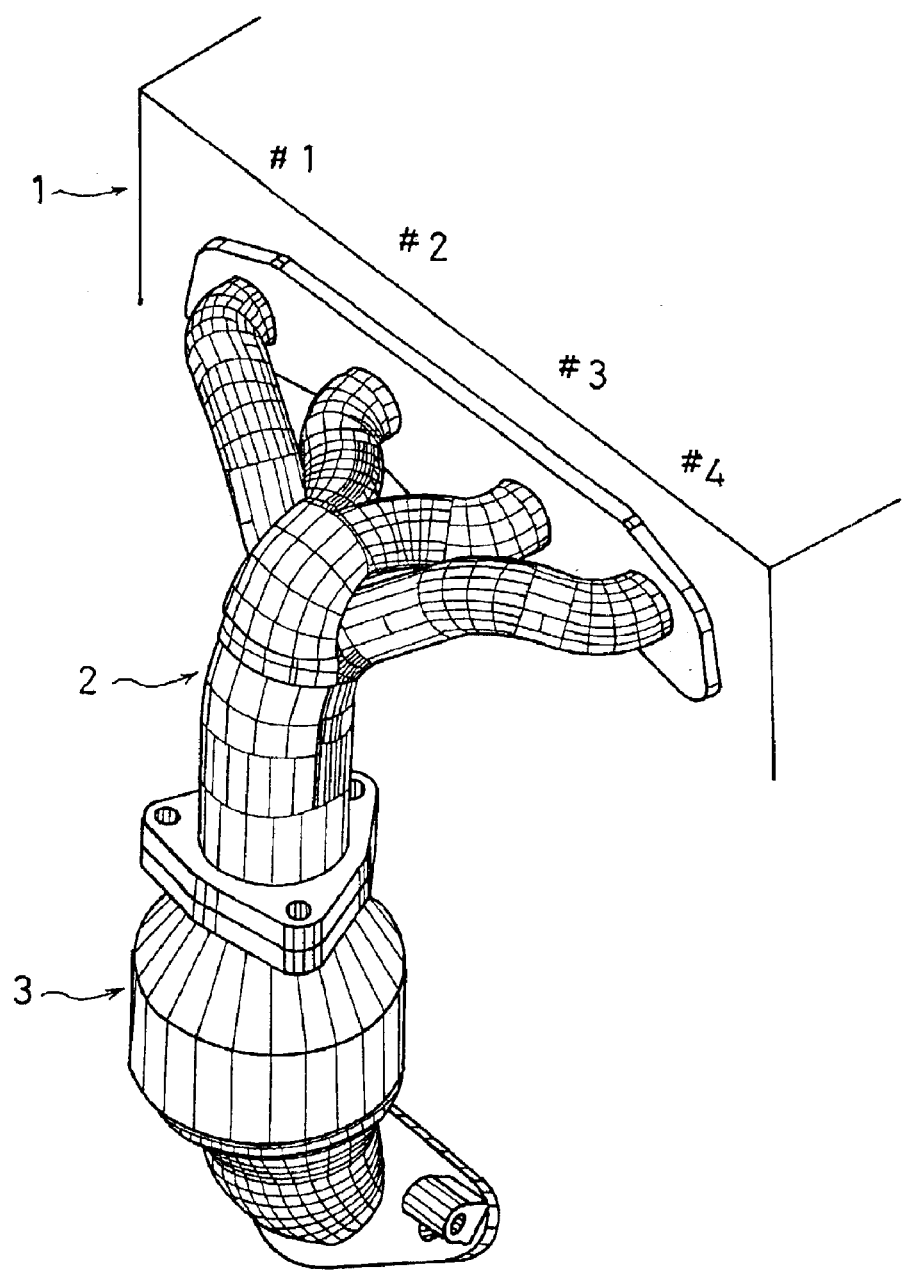
FIG. 1 is a schematic perspective view of an engine and an exhaust manifold of a first embodiment according to the invention.

FIG. 1 is a schematic perspective view of an engine and an exhaust manifold of a first embodiment according to the invention.

An engine 1 is a four-cylinder engine where a firing (for example, spark or ignition) thereof is carried out in the order of cylinder #1, cylinder #3, cylinder #4, and cylinder #2. An exhaust manifold 2 is mounted to a cylinder head side and connected to an exhaust port outlet for each cylinder and a manifold catalyst 3 is mounted to an outlet of exhaust manifold 2.

Figure 2:
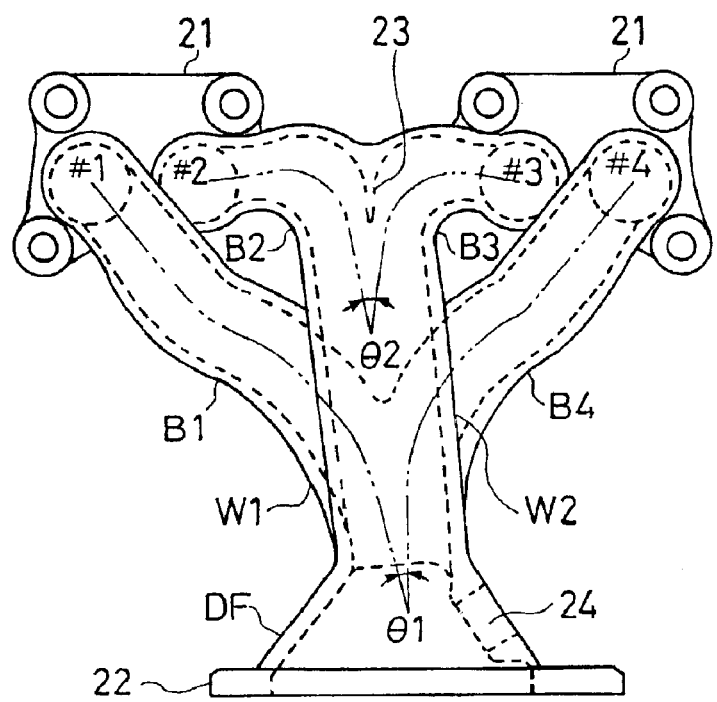
FIG. 2 is an elevation view of the exhaust manifold.
Figure 3:
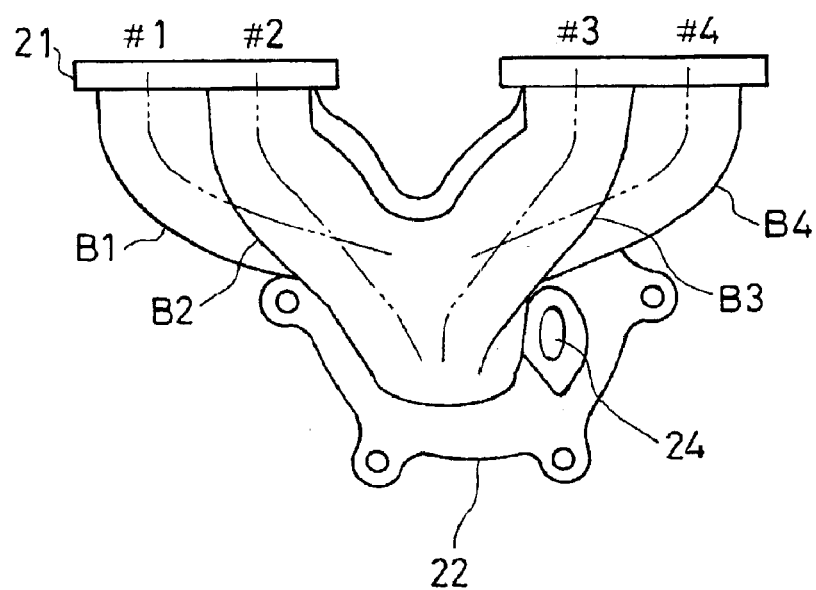
FIG. 3 is a plan view of the exhaust manifold.
Figure 4:
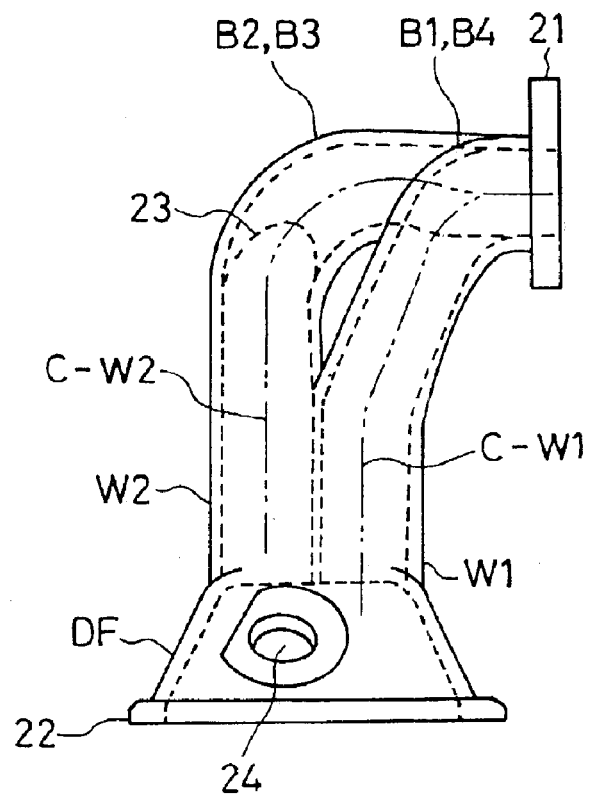
FIG. 4 is a side elevation view of the exhaust manifold.
Figure 5:
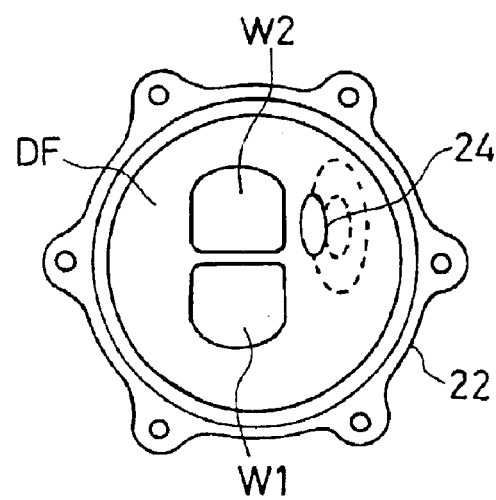
FIG. 5 is a bottom view of the exhaust manifold.

Exhaust manifold 2 will be explained in more detail with reference to FIG. 2–FIG. 5. FIG. 2 is an elevation view of exhaust manifold 2, FIG. 3 is a plan view thereof, FIG. 4 is a side view thereof, and FIG. 5 is a bottom view thereof.

Exhaust manifold 2 comprises branches B1–B4 connected respectively to the exhaust port outlet of each cylinder of engine 1 through a flange 21, a convergence branch W1 where branch B1 of cylinder #1 and branch B4 of cylinder #4 that are not fired in succession and positioned at an outward side of a cylinder-in-line direction are convergent, a convergence branch W2 where branch B2 of cylinder #2 and branch B 3 of cylinder #3 that are not fired in succession and positioned at an inward side of a cylinder-in-line direction are convergent, and a collection portion (diffuser portion) DF where convergent branches W1 and W2 are further made convergent and expanded downwardly.

Manifold catalyst 3 is mounted to an outlet of collection portion DF through a flange 22. Branch B1 of cylinder #1 and branch B4 of cylinder #4 extend in an inward and slanting, downward direction and then, are convergent where its convergence angle (an angle that two center axis lines of branch B1 and branch B4 form at a convergence point thereof) θ1 is equal to or below 20 degrees.

Branch B2 of cylinder #2 and branch B3 of cylinder #3 positioned inwardly are oppositely and laterally projected from the exhaust port outlet and get convergent at a minimum length from a plan view where a convergence angle θ2 thereof is made below 20 degrees by disposing a partition wall 23.

Convergent branch W1 of branch B1 and B4 positioned outwardly is placed between engine 1 and convergent branch W2 of branch B2 and B3 positioned inwardly and convergent branch W1 is substantially parallel to convergent branch W2. Especially, convergent branch W2 is convergent at a more upstream side, thereby forming one straight pipe. These convergent branches W1, W2 are opened to collection portion DF with W1 and W2 being kept in parallel and get convergent therein (FIG. 4) where the convergence angle θ3 is 0 degrees due to a center axis C-W1 of W 1 and a center axis C-W2 of W2 being in parallel, but may be equal to or below 20 degrees.

Namely, the exhaust manifold branches of the cylinders that are not fired in succession get convergent at a convergence angle equal to or below 20 degrees and subsequently, convergent branches W1, W2 thereof get convergent at a convergence angle below 20 degrees. Collection portion DF is expanded in diameter downwardly and a mounting bore 24 for an air-fuel ratio sensor (O2 sensor) is formed in an intermediate outer wall thereof.

The air-fuel ratio sensor is positioned within a plane in parallel with the partition wall between convergent branches W1 and W2 opened to collection portion DF with reference to FIG. 5.

As described above, branch B1 of cylinder #1 and branch B4 of cylinder #4 that are not fired in succession and have little exhaust gas interference with each other become convergent at a distance as short as possible and so are branch B2 of cylinder #2 and branch B3 of cylinder #3. Accordingly, a total length of an exhaust manifold can be shortened without a torque reduction at low and intermediate speed ranges.

Branch B2 of cylinder #2 and branch B3 of cylinder #3 positioned inwardly are oppositely and laterally projected from the exhaust port outlet and get convergent at a minimum length and after convergence thereof, convergence branch W2 is formed of one single manifold. Therefore, a total length of the exhaust manifold is minimized.

In addition to that, convergent branch W1, after convergence, is formed of one single straight pipe, permitting a minimum total length of the exhaust manifold.

With this arrangement, the total length of the exhaust manifold is minimized and thereby, temperature rise performance of a manifold catalyst after an engine is started can be improved.

Figure 6:
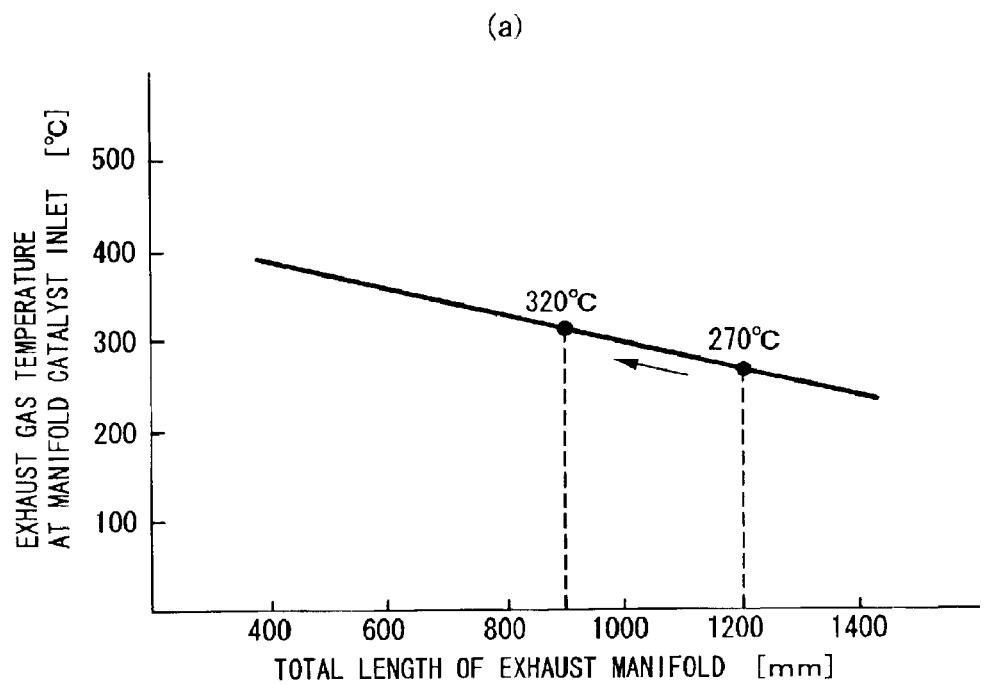
FIGS. 6a and 6b are views showing a relationship between a total length of an exhaust manifold and an exhaust temperature.
Figure 6:
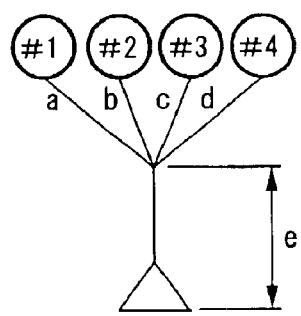
Figure 6:
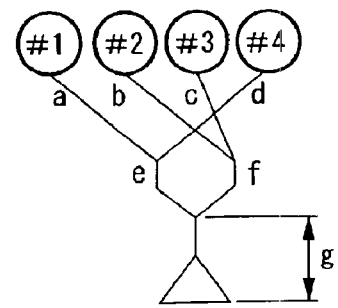

FIG. 6(a) shows a relationship between a total length of an exhaust manifold and an exhaust gas temperature (especially, an exhaust gas temperature immediately before the manifold catalyst in a lapse of 15 minutes after the engine is started).

According to the invention, with the total length of the exhaust manifold being shortened from 1200 mm to 900 mm, the exhaust gas temperature immediately before the manifold catalyst can rise up to from 270 degrees to 320 degrees.

The total length of the exhaust manifold, as shown in FIG. 6(b), is represented as a total length of each exhaust manifold branch and each convergence branch from each cylinder to a manifold catalyst.

Figure 7:
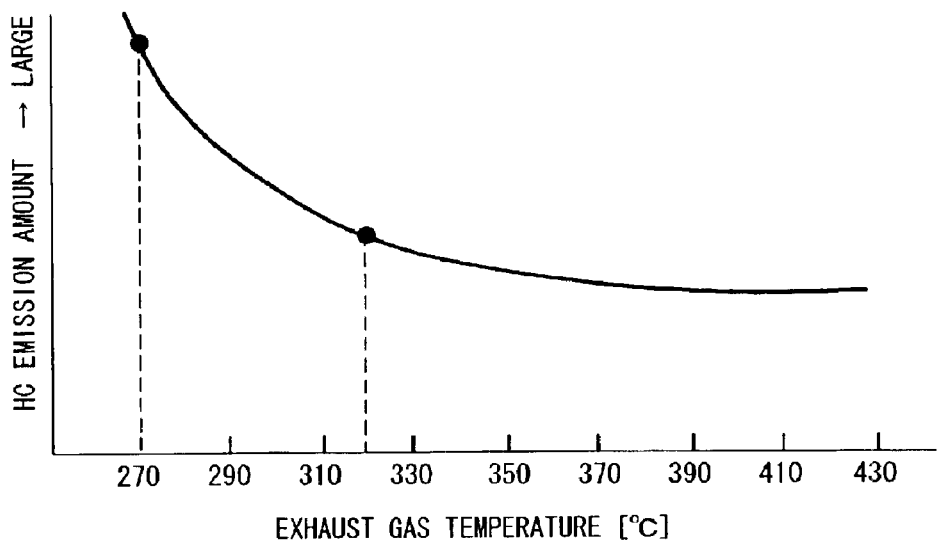
FIG. 7 is a view showing a relationship between an exhaust gas temperature and HC emission amount.

FIG. 7 shows a relationship between an exhaust gas temperature immediately before the manifold catalyst in 15 minutes after an engine is started and HC emission amount at a manifold catalyst outlet during the same period of time (15 minutes) where due to improvement of temperature rise performance of the manifold catalyst after the engine is started (from 270 degrees C. to 320 degrees C.), a catalyst activation is promoted and HC emission amount can be reduced.

The convergence portion of the branches is formed of a shape such that the propagation path of the exhaust pulsation makes it difficult to go around into another exhaust manifold for a convergence angle of the branches equal to or below 20 degrees, thereby improving exhaust emission.

In a case where the convergence angle is large, a blowdown wave of cylinder #1 goes around the convergence into a different cylinder, an exhaust gas interference in the different cylinder occurs or the exhaust gas interference occurs in cylinder #1 itself due to the wave reflected by an exhaust valve head closed in the different cylinder.

Figure 8:
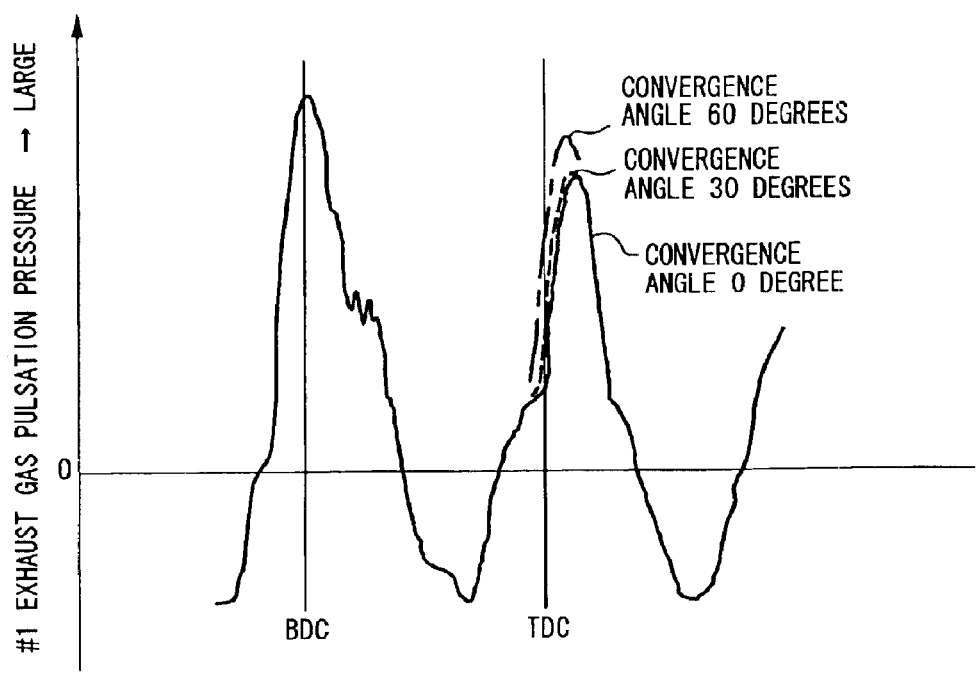
FIG. 8 is a view showing an influence on an exhaust gas pulsation pressure by a convergence angle of exhaust manifold branches.

As shown in FIG. 8, in case of 60 degrees, 30 degrees, and 0 degree as a convergence angle, an exhaust gas pulsation pressure at the exhaust port outlet of cylinder #1 is respectively measured. It is confirmed from this measurement that the exhaust gas pulsation pressure in the vicinity of a valve overlap period from an intake valve opening timing to an exhaust valve closing timing is lowered more as the convergence angle is made small, permitting decrease of the exhaust gas interference and also in case of the convergence angle being equal to or below 30 degrees, a level of the exhaust gas interference substantially as low as in a case of the convergence of 0 degrees can be achieved.

Figure 9:
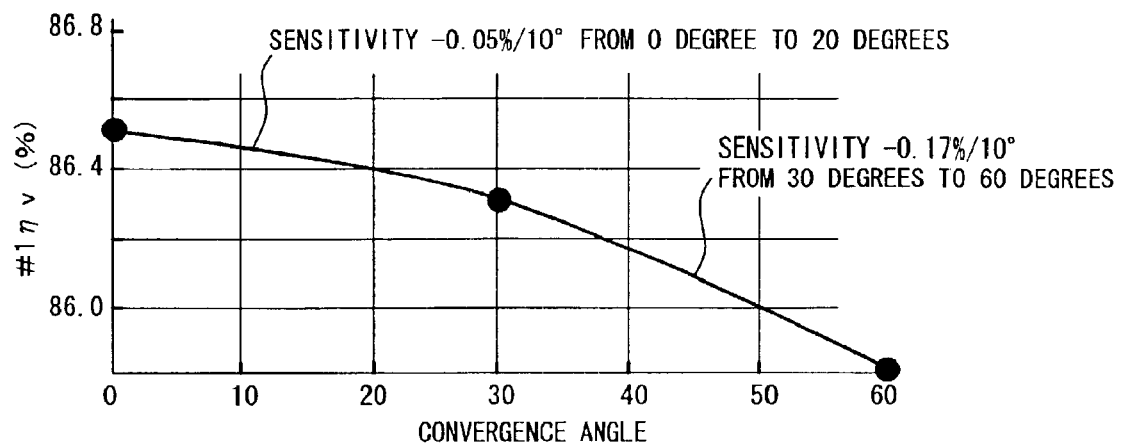
FIG. 9 is a view showing a relationship between the convergence angle and an intake volumetric efficiency.

FIG. 9 shows a relationship between a convergence angle and an intake volumetric efficiency ($\eta v$) where in the range of from 30 degrees to 60 degrees as a convergence angle, an intake volumetric efficiency decreases by 0.17% each time for an increase of 10 degrees (sensitivity–0.17%/10 degrees) and in a case of from 0 degrees to 20 degrees as a convergence angle, an intake volumetric efficiency decreases by 0.05% each time for an increase of 10 degrees (sensitivity–0.05%/10 degrees).

Namely, when a convergence angle lies in the range of 0 degrees–20 degrees of the convergence angle, there is almost no change of the intake volumetric efficiency decrease and when the convergence angle exceeds 20 degrees, the intake volumetric efficiency abruptly drops. The above results are true of a convergence angle of convergence branches W1 and W2.

The present invention, in view of this result, properly reduces an exhaust gas interference with a convergence angle equal to or below 20 degrees.

Reduction of exhaust gas interference due to opening timing delay of an exhaust valve will be explained.

Figure 15:
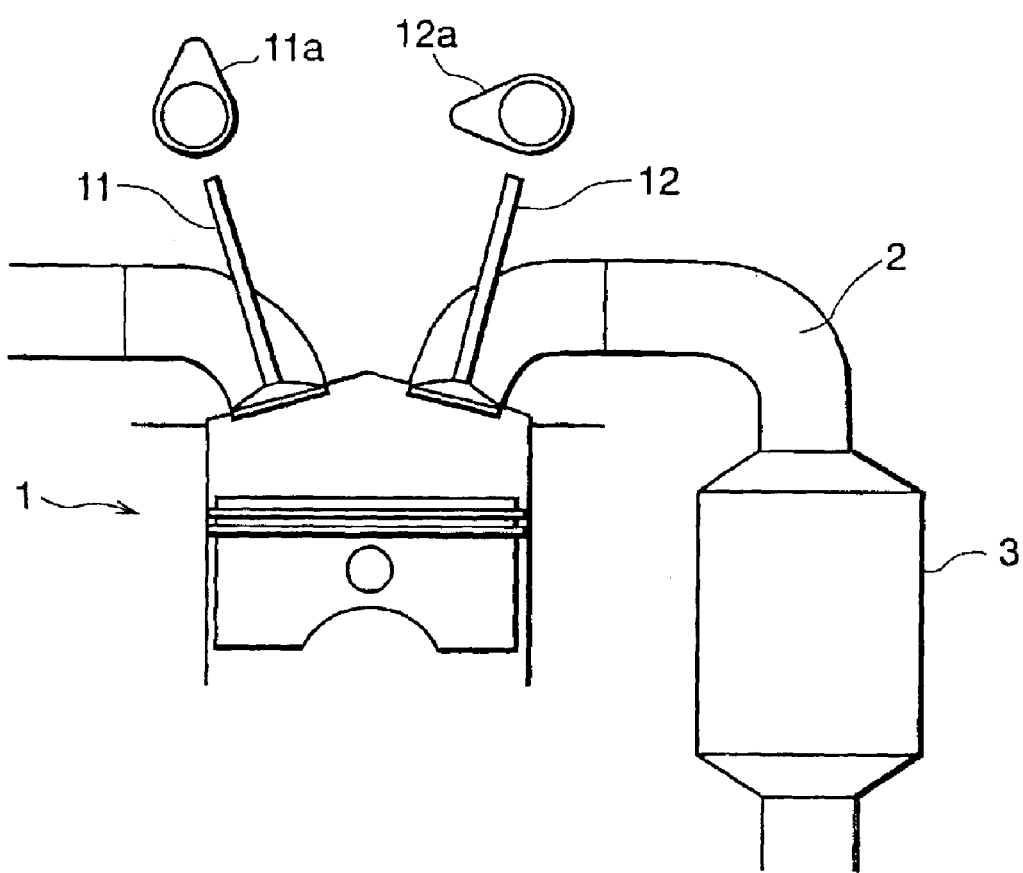
FIG. 15 is an explanation view of an intake valve and an exhaust valve of an engine.

As shown in FIG. 15, opening timing and closing timing of an intake valve 11 and an exhaust valve 12 are determined by each cam profile of an intake valve driving cam 11a and an exhaust valve driving cam 12a.

Figure 10:
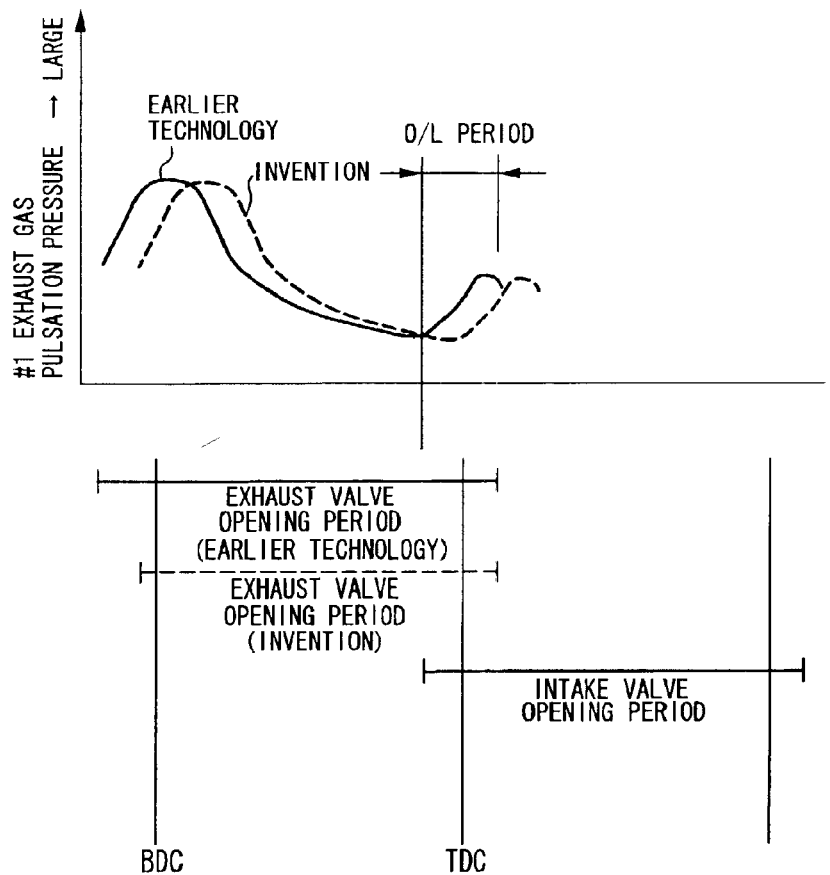
FIG. 10 is a view showing an effect due to a closing timing retard of an exhaust valve.

An exhaust valve opening timing is normally about 45 degrees before bottom dead center, but by setting it in the range of 0 degree–30 degrees before bottom dead center, timing of the blowdown wave is delayed as shown in a dotted line compared to an earlier technology in a solid line as shown in FIG. 10.

With this arrangement, a reflection wave does not reach a cylinder during a valve overlap period of intake valve 11 and exhaust valve 12 in the cylinder.

For example, a blowdown wave in cylinder #2 reaches an exhaust valve head of cylinder #3 and returns back to cylinder #2 as a reflection wave after the overlap period of intake and exhaust valves 11,12 in cylinder #2, thereby improving the exhaust gas interference during the valve overlap period and the output torque at low and intermediate speed ranges.

Change of the exhaust valve opening timing can be made by shortening an operating angle of exhaust valve driving cam 12a, varying an operating angle of exhaust valve 12, varying an operating angle and a lift amount of exhaust valve 12, varying an operating center angle of exhaust valve 12, and so on.

Figure 11:
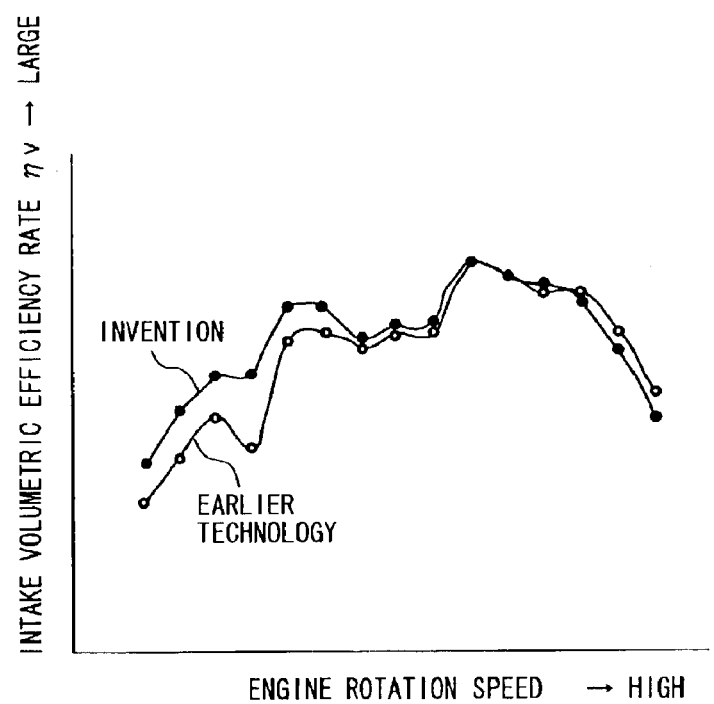
FIG. 11 is a view showing an improvement effect of an intake volumetric efficiency according to the invention.
Figure 12:
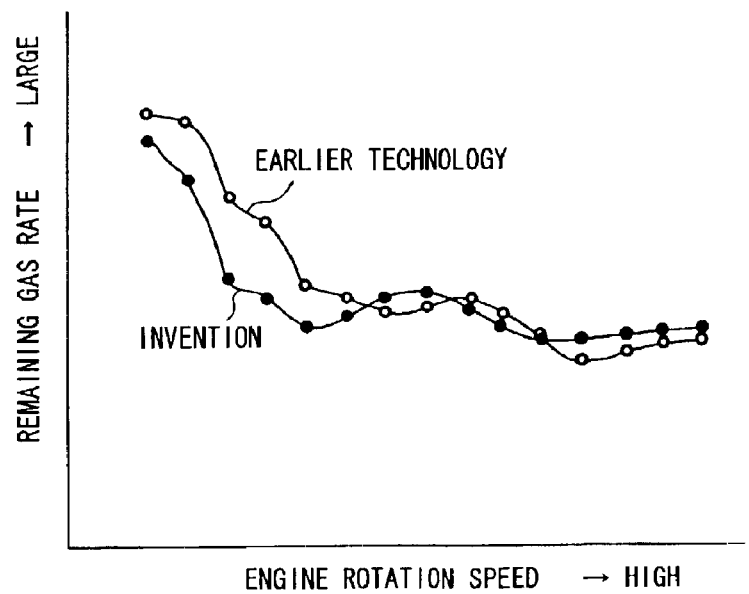
FIG. 12 is a view showing a reduction effect of a remaining gas rate according to the invention.

FIG. 11 shows an improvement effect of an intake volumetric efficiency due to an exhaust gas interference reduction. FIG. 12 shows a reduction effect of a remaining gas rate. Since in any of them, a scavenging efficiency improves due to the exhaust gas interference reduction at low and intermediate speed ranges, the intake volumetric efficiency improves and as a result, the remaining gas efficiency improves.

Accordingly, by improvement of the intake volumetric efficiency, an engine output performance improves and by reduction of the remaining gas efficiency, a combustion temperature decreases, thereby improving a knocking performance.

However, as seen from FIGS. 11 and 12, at a high speed range the intake volumetric efficiency and the remaining gas efficiency deteriorate a little as a consequence of a delay of the exhaust valve opening timing.

Coping with this deterioration, a bend ratio of a manifold diameter of an exhaust manifold branch is set as equal to or more than 1.5 or an expanding angle of a collection portion (diffuser portion) is set as equal to or less than 60 degrees. With this arrangement, airflow resistance in the exhaust manifold improves and the above consequence can be prevented.

In case of use of a variable valve operating apparatus, delay of an exhaust valve opening timing may be made only at low and intermediate speed ranges (for example, below 4000 rpm).

A mounting position of an air-fuel ratio sensor will be explained. It becomes easy to narrow tuning factors for finding out an optimal position of an air-fuel ratio sensor in terms of cylinder sensitivity of the sensor caused by forming a straight manifold portion in convergent branch W1 of cylinder #1 and cylinder #4 and convergent branch W2 of cylinder #2 and cylinder #3. Accordingly, an optimal position of the air-fuel ratio sensor can be determined with a little man-hour.

Specifically sensitivity of the sensor to exhaust gases of cylinder #1 and cylinder #4, as well as exhaust gases of cylinder #2 and cylinder #3 is confirmed by adjusting a position of an air-fuel ratio sensor in the left and right direction in FIG. 4. As a result, an optimal position of the air-fuel ratio sensor to satisfy the sensitivity to both exhaust gases is determined at which a mounting bore 24 for the air-fuel ratio sensor is formed.

Figure 13:
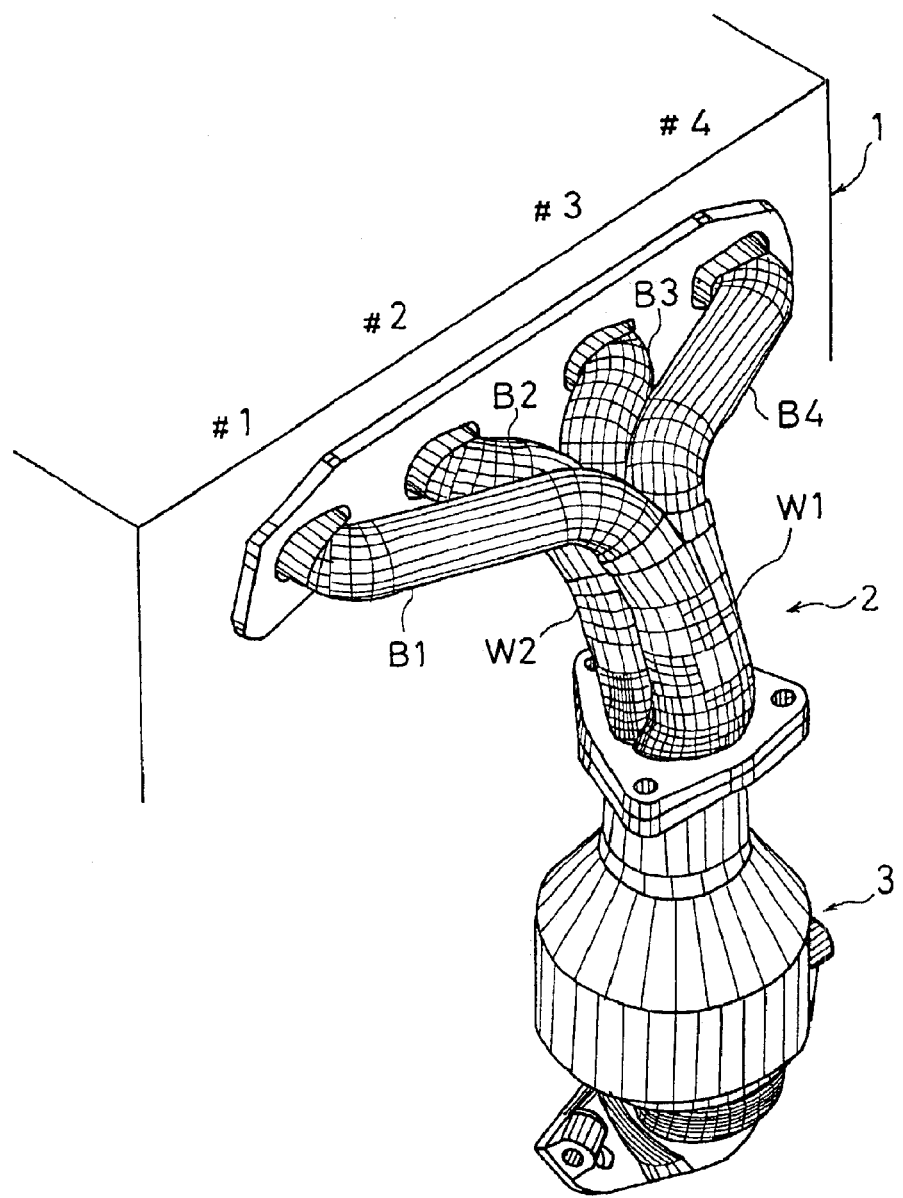
FIG. 13 is a schematic perspective view of an engine and an exhaust manifold of a second embodiment according to the invention.

FIG. 13 is a schematic perspective view of an engine and an exhaust manifold of a second embodiment according to the invention. The second embodiment is different from the first embodiment in that convergent branch W2 of branch B2 of cylinder #2 and branch B3 of cylinder #3 is placed between the engine and convergent branch W1 of branch B1 of #1 cylinder and branch B4 of cylinder #4 and is the same as in the rest thereof.

Figure 14:
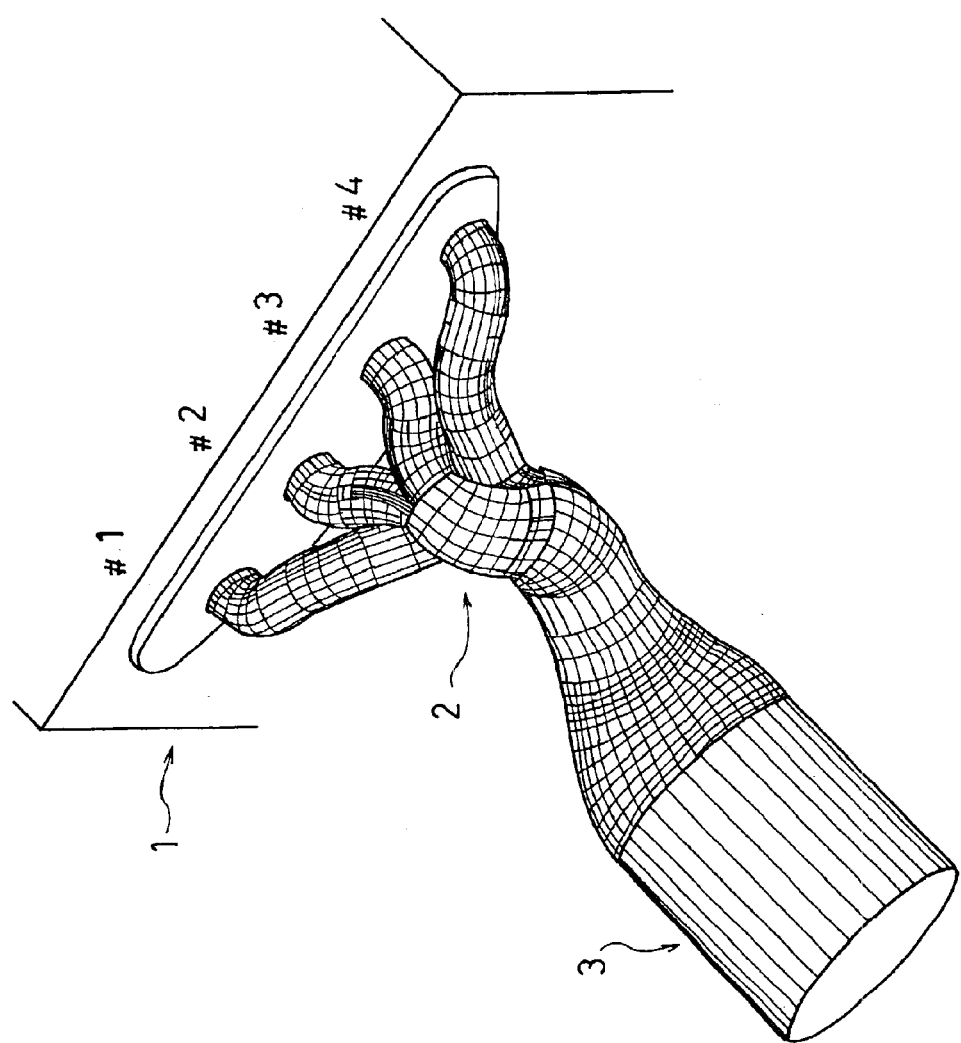
FIG. 14 is a schematic perspective view of an engine and an exhaust manifold of a third embodiment according to the invention.

FIG. 14 is a schematic perspective view of an engine and an exhaust manifold of a third embodiment according to the invention. In the first embodiment, the engine is placed in a lateral direction of a vehicle and an exhaust system is disposed in a front side of the vehicle. In the third embodiment, the exhaust system is disposed in a rear side of the vehicle.

As described above, according to the invention, in an exhaust manifold of a four-cylinder engine, two exhaust manifold branches of two cylinders that are not fired in succession are made convergent in a convergence angle equal to or below 20 degrees and subsequently the two convergent branches are further made convergent.

Namely, the exhaust manifold branches of the cylinders that have no problem with exhaust gas interference by the pressure wave of the exhaust gases are made convergent in a relatively upstream side thereof and the convergence angle is made equal to or below 20 degrees for preventing the pressure of the exhaust gases of the one cylinder side from going around into the other cylinder side.

As a result, the exhaust gas interference between the one cylinder and the other cylinder, as well as inside the one cylinder is greatly reduced. Therefore, while the torque decrease at low and intermediate speed ranges is prevented, a total length of the exhaust manifold is shortened by eliminating an independent portion of the exhaust manifold as much as possible and temperature rise performance of the manifold catalyst after the engine is started can be improved.

Moreover, the four-cylinder engine is fired in order of cylinder #1, cylinder #3, cylinder #4, and cylinder #2 where the two exhaust manifold branches of cylinder #1 and cylinder #4, as well as of cylinder #2 and cylinder #3, that are not fired in succession get respectively convergent, and thus, the two cylinders (cylinders #1 and #4) in the outward side of a cylinder-in-line direction are convergent and the two cylinders (cylinders #2 and #3) in the inward side thereof are independently made convergent before the entire exhaust manifold branches are convergent.

Therefore, the layout of the exhaust manifold is simple and the cylinders in the inward side can be made convergent more upstream. As a result, the independent portion of the exhaust manifold can be shortened and the temperature rise performance of the exhaust catalyst is improved.

Further, the two manifold branches of the cylinder #2 and cylinder #3 are projected in an opposite and lateral direction and subsequently are made convergent, namely, the two manifold branches are of lateral shape projecting from each port outlet of the cylinders into each other's port outlet. Accordingly, the manifold branches can be convergent at a minimum distance and a total length of the exhaust manifold is minimized. Therefore, a catalyst activation time can be shortened a lot more.

And according to the invention, in a four-cylinder engine that is fired in order of cylinder #1, cylinder #3, cylinder #4, and cylinder #2, the two exhaust manifold branches of cylinder #1 and cylinder #4, as well as of cylinder #2 and cylinder #3, that are not fired in succession get respectively convergent and subsequently the two convergent branches are made convergent. On the other hand, the convergence position of the two exhaust manifold branches of cylinder #2 and cylinder #3 is placed upstream of the convergence position of the two exhaust manifold branches of cylinder #1 and cylinder #4. Namely, the exhaust manifold branches of the cylinders that have no problem with exhaust gas interference by the pressure wave of the exhaust gases are made convergent in a relatively upstream side thereof and the two cylinders (#2 cylinder and #3 cylinder) in the inward side that can be convergent in a more upstream side in view of a layout is made convergent before the two other cylinders (cylinders #1 and #4).

As a result, the torque decrease at low and intermediate speed ranges due to exhaust gas interference is prevented, a total length of the exhaust manifold is shortened by eliminating independent portions of the exhaust manifold as much as possible and temperature rise performance of the manifold catalyst after the engine is started can be improved.

Further, since the convergent branch after the two exhaust manifold branches of cylinder #2 and cylinder #3 are convergent is formed of one straight pipe, a total length of the exhaust manifold is shortened and temperature rise performance of the manifold catalyst after the engine is started can be improved.

Further, the two manifold branches of cylinder #2 and cylinder #3 are projected in an opposite and lateral direction and subsequently are made convergent.

Accordingly, the two manifold branches of cylinder #2 and cylinder #3 can be convergent at a minimum distance and a total length of the exhaust manifold is minimized. Therefore, a catalyst activation time can be shortened greatly.

Further, each convergence angle of the exhaust manifold branches of cylinder #1 and cylinder #4 and cylinder #2 and cylinder #3 is equal to or below 20 degrees and further a convergence angle of the two convergent branches is equal to or below 20 degrees.

Thereby, the invention properly prevents a wave pressure of the exhaust gas from going around a convergence point of the exhaust manifold.

As a result, the exhaust gas interference between the one cylinder and the other cylinder, as well as inside the one cylinder is greatly reduced and the torque decrease at low and intermediate speed ranges is prevented.

Further, timing of a blowdown is delayed by retarding an exhaust valve opening timing of an engine as beyond 30 degrees before bottom dead center. Thereby, an exhaust gas interference during a valve overlap improves and an output torque at low and intermediate speed ranges improves.

As described above, the invention is explained by using a four-cylinder engine, but the invention also can be applied to an eight-cylinder engine, for example, each four-cylinderV-type eight-cylinder engine.

This application claims priority to Japanese Patent Application No. 2002-063605 filed Mar. 8, 2002. The entire disclosure of Japanese Patent Application No. 2002-063605 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined by the appended claims and their equivalents. Moreover, features of the different embodiments may be combined.

What is claimed:

1. An engine comprising:

four cylinders;

an exhaust manifold mounted to a cylinder head of the engine; and four exhaust manifold branches included in the exhaust manifold and arranged to each cylinder, wherein two exhaust manifold branches of two cylinders that are not fired in succession are convergent at a convergence angle equal to or below 20 degrees to form a first convergent exhaust manifold branch, two exhaust manifold branches of another two cylinders that are not fired in succession are convergent at a convergence angle equal to or below 20 degrees to form a second convergent exhaust manifold branch, and the first convergent exhaust manifold branch and the second convergent exhaust manifold branch are thereafter made convergent, wherein the four cylinders line up in order of cylinder #1, cylinder #2, cylinder #3, and cylinder #4, the four cylinders being fired in order of cylinder #1, cylinder #3, cylinder #4, and cylinder #2, wherein the two exhaust manifold branches of the cylinder #1 and the cylinder #4 arranged at both ends in a cylinder-in-line direction of the engine are convergent, and the two exhaust manifold branches of the cylinder #2 and the cylinder #3 arranged between the cylinder #1 and the cylinder #4 in the cylinder-in-line direction of the engine are convergent, and wherein the second convergent exhaust manifold branch is formed such that the two exhaust manifold branches of the cylinder #2 and the cylinder #3 are projected toward each other and substantially along the cylinder-in-line direction, and are thereafter convergent.

2. An engine according to claim 1, wherein the first convergent exhaust manifold branch and the second convergent exhaust manifold branch are convergent at a convergence angle equal to or below 20 degrees.

3. An engine comprising:

four cylinders that line up in order of cylinder #1, cylinder #2, cylinder #3, and cylinder #4;

an exhaust manifold mounted to a cylinder head of the engine; and four exhaust manifold branches included in the exhaust manifold and arranged to each cylinder, wherein the four cylinders are fired in order of cylinder #1, cylinder #3, cylinder #4, and cylinder #2, two exhaust manifold branches of the cylinder #1 and the cylinder #4 are convergent to form a first convergent exhaust manifold branch, two exhaust manifold branches of the cylinder #2 and the cylinder #3 are convergent to form a second convergent exhaust manifold branch, the first convergent exhaust manifold branch and the second convergent exhaust manifold branch are thereafter made convergent, a convergence position of the second convergent exhaust manifold branch is placed upstream of a convergence position of the first convergent exhaust manifold branch, and a convergence angle of the first convergent exhaust manifold branch, as well as a convergence angle of the second convergent exhaust manifold branch are respectively equal to or below 20 degrees.

4. An engine according to claim 3, wherein the second convergent exhaust branch is formed of one straight pipe.

5. An engine according to claim 3, wherein the second convergent exhaust manifold branch is formed such that the two exhaust manifold branches of the cylinder #2 and the cylinder #3 are projected toward each other and substantially along a cylinder-in-line direction, and are thereafter convergent.

6. An engine according to claim 3, wherein a convergence angle of the first and the second convergent exhaust manifold branches is equal to or below 20 degrees.

7. An engine comprising:

four cylinders;

an exhaust manifold mounted to a cylinder head of the engine;

four exhaust manifold branches included in the exhaust manifold and arranged to each cylinder; and an exhaust valve disposed in a combustion chamber of the engine that controls an exhaust gas from the combustion chambers, wherein two exhaust manifold branches of two cylinders that are not fired in succession are convergent at a convergence angle equal to or below 20 degrees to form a first convergent exhaust manifold branch, two exhaust manifold branches of another two cylinders that are not fired in succession are convergent at a convergence angle equal to or below 20 degrees to form a second convergent exhaust manifold branch, the first convergent exhaust manifold branch and the second convergent exhaust manifold branch are thereafter made convergent, and an exhaust gas valve opening timing of the exhaust valve is set in the range of from 30 degrees before bottom dead center to the bottom dead center.

8. An engine comprising:

four cylinders that line up in order of cylinder #1, cylinder #2, cylinder #3, and cylinder #4;

an exhaust manifold mounted to a cylinder head of the engine;

four exhaust manifold branches included in the exhaust manifold and arranged to each cylinder; and an exhaust valve disposed in a combustion chamber of the engine that controls an exhaust gas from the combustion chambers, wherein the four cylinders are fired in order of cylinder #1, cylinder #3, cylinder #4, and cylinder #2, two exhaust manifold branches of the cylinder #1 and the cylinder #4 are convergent to form a first convergent exhaust manifold branch, two exhaust manifold branches of the cylinder #2 and the cylinder #3 are convergent to form a second convergent exhaust manifold branch, the first convergent exhaust manifold branch and the second convergent exhaust manifold branch are thereafter made convergent, a convergence position of the second convergent exhaust manifold branch is placed upstream of a convergence position of the first convergent exhaust manifold branch, and an exhaust gas valve opening timing of the exhaust valve is set in the range of from 30 degrees before bottom dead center to the bottom dead center.

9. An engine, comprising:

four cylinders;

an exhaust manifold mounted to a cylinder head of the engine; and four exhaust manifold branches included in the exhaust manifold and arranged to each cylinder so as to form a shortest possible exhaust route for an exhaust gas, running from the cylinder head toward a catalyst inlet to be connected to an exhaust pipe, wherein two exhaust manifold branches of two cylinders that are not fired in succession are convergent at a convergence angle equal to or below 20 degrees to form a first convergent exhaust manifold branch, two exhaust manifold branches of another two cylinders that are not fired in succession are convergent at a convergence angle equal to or below 20 degrees to form a second convergent exhaust manifold branch, and the first convergent exhaust manifold and the second convergent exhaust manifold are thereafter made convergent.

10. The engine of claim 9, wherein the shortest possible exhaust route comprises a minimum length from the cylinder head to the catalyst inlet.

* * * * *